United States Patent
Sultan et al.

(10) Patent No.: US 8,005,113 B2
(45) Date of Patent: Aug. 23, 2011

(54) ENCAPSULATING LARGE ETHERNET FRAMES

(75) Inventors: Robert Sultan, Somers, NY (US); Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 41 days.

(21) Appl. No.: 12/415,735

(22) Filed: Mar. 31, 2009

(65) Prior Publication Data

US 2009/0252179 A1    Oct. 8, 2009

Related U.S. Application Data

(60) Provisional application No. 61/043,157, filed on Apr. 8, 2008.

(51) Int. Cl.
*H04L 29/04* (2006.01)
(52) U.S. Cl. ........................................................ 370/470
(58) Field of Classification Search ................ 370/238, 370/389, 401, 395.31, 216, 241.1; 455/418
See application file for complete search history.

(56) References Cited

U.S. PATENT DOCUMENTS

| | | | | |
|---|---|---|---|---|
| 7,130,303 B2 * | 10/2006 | Hadzic | ........................... | 370/389 |
| 7,768,928 B2 * | 8/2010 | Harel et al. | ................. | 370/241.1 |
| 2003/0193944 A1 * | 10/2003 | Sasagawa | ...................... | 370/389 |
| 2003/0193959 A1 * | 10/2003 | Lui et al. | ........................ | 370/401 |
| 2005/0220091 A1 * | 10/2005 | LaVigne et al. | ............. | 370/389 |
| 2006/0018315 A1 | 1/2006 | Baratakke et al. | | |
| 2006/0171406 A1 | 8/2006 | Kwon et al. | | |
| 2008/0159150 A1 * | 7/2008 | Ansari | ........................... | 370/238 |
| 2008/0247399 A1 * | 10/2008 | Hazard | ..................... | 370/395.31 |
| 2008/0291823 A1 * | 11/2008 | Saltsidis | ........................ | 370/216 |
| 2010/0056126 A1 * | 3/2010 | Tachikawa | ..................... | 455/418 |

FOREIGN PATENT DOCUMENTS

CN    1822573 A    8/2006

OTHER PUBLICATIONS

IEEE 802.1Qaw/D2.0, "Draft Standard for Local and Metropolitan Area Networks- Virtual Bridged Local Area Networks- Amendment 10: Data Driven and Data Dependent Connectivity Fault Management," IEEE Computer Society, Jan. 4, 2008, 79 pages.
Foreign Communication From a Related Counterpart Application— International Search Report and Written Opinion, PCT/CN2009/ 071190, Jul. 16, 2009, 12 pages.
Foreign Communication from a Related Counterpart European Application No. 09730303.6—Extended European Search Report, Dec. 17, 2010, 14 pages.

(Continued)

*Primary Examiner* — Kwang B Yao
*Assistant Examiner* — Syed M Bokhari
(74) *Attorney, Agent, or Firm* — Conley Rose, P.C.; Grant Rodolph (57) ABSTRACT

A method comprising receiving a data frame, encapsulating the received data frame into a reflected frame message (RFM) encapsulated frame, and if the received data frame causes the RFM encapsulated frame to exceed a maximum service data unit size, either the data frame is truncated or the data frame is split into two smaller frames and those two smaller frames are encapsulated by two separate RFM frames, wherein if a truncation flag is set to be true, the data frame is truncated to be encapsulated in one RFM.

19 Claims, 5 Drawing Sheets

OTHER PUBLICATIONS

Seaman, M., "Diagnosing Data Dependent and Data Driven Connectivity Faults", Internet Citation, Mar. 15, 2006. Retrieved from the Internet: URL:http://www.ieee802.org/1/pages/802.1aw.html.

IEEE Standard for Local and Metropolitan Area Networks Amendment 5: Connectivity Fault Management, IEEE 802.1ag, Dec. 17, 2007, 260 pages.

"IEEE P802.1Qaw/D0.2, Draft Standard for Local and Metropolitan Area Networks—Virtual Bridged Local Bridged Local Area Networks—Amendment 10: Virtual Bridged Local Area Networks, Management of Data Driven and Data Dependent Connectivity Fault Management", Internet Citation, Apr. 27, 2007, pp. 1-62, XP003023898.

\* cited by examiner

ENCAPSULATING LARGE ETHERNET FRAMES

CROSS-REFERENCE TO RELATED APPLICATIONS

The present application claims priority to U.S. Provisional Patent Application No. 61/043,157 filed Apr. 8, 2008 by Robert Sultan, et al. and entitled "Encapsulating Large Ethernet Frames," which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as those based on Ethernet Bridging technology, are comprised of nodes that forward data frames across the network. To transfer the frames across the network, a plurality of network standards are used. For instance, the Institute of Electrical and Electronics Engineers (IEEE) 802.1Qaw standard for Data Dependent and Data Driven Connectivity Fault Management (DDCFM) is being developed to diagnose problems that are sensitive to the content of the transferred data. Such problems are difficult to reproduce with procedures such as Loopback that are based on the exchange of control messages rather than user data.

SUMMARY

In one embodiment, the disclosure includes a method comprising receiving a data frame, encapsulating the received data frame into a reflected frame message (RFM) encapsulated frame, and if the received data frame causes the RFM encapsulated frame to exceed a maximum service data unit size, either the data frame is truncated or the data frame is split into two smaller frames and those two smaller frames are encapsulated by two separate RFM frames, wherein if a truncation flag is set to be true, the data frame is truncated to be encapsulated in one RFM.

In another embodiment, the disclosure includes a network component comprising a processor configured to implement a method comprising determining a maximum number of bytes allowed to be copied into a Reflected Data type length value (TLV)'s value field in order to keep a RFM's service data unit size not exceeding its Maximum Service Data Unit Size (MSDUS), wherein a RFM protocol data unit (PDU) comprises a common 5 byte connectivity fault management (CFM) header comprising 4 bytes for the CFM header plus 1 byte for an End TLV, a 4 byte Transaction Identifier, a 3 byte Reflected Data TLV Type/Length field, and an actual number of bytes of the reflected data frame, wherein if there is no other optional TLV for a RFM data frame, then a maximum data TLV value size (maxDataTLVvalueSize) equals the MSDUS minus a CFM common header length plus a Transaction Identifier length plus a Reflected Data Frame TLV Type/Length field length.

In yet another embodiment, the disclosure includes a bridge configured to implement a method comprising configuring a Reflected Data TLV in a RFM to be a Data TLV that contains a reflected data frame, wherein a Length field is the total octets of the reflected data frame, wherein a Type field of the Reflected Data TLV is a Data TLV Type value, a Truncated Data TLV Type value, a Data-Part-1 TLV Type value, or a Data-Part-2 TLV Type value.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Faults in bridged networks, such as bridged Virtual Local Area Networks (VLANs) may comprise data independent faults, which may result from repetitive loss or misdirection of frames, for example due the failure of a link or bridge. Alternatively, the faults may comprise data dependent and/or data driven faults, such that the content of particular data frames is the cause of faults. The data dependent and data driven faults (DDFs) may be diagnosed by isolating them to a particular network component, such as a link or a Bridge, or a segment of the network, comprising a sequence of such network components. The DDF may be isolated by dividing the network into a plurality of segments and verifying whether a plurality of frames may traverse each segment as expected. When a network segment is identified as faulty, the segment may be further divided into a plurality of smaller segments until a specific faulty component is identified.

Disclosed herein are systems and methods for forwarding frames, which may be used for DDCFM. The frames may be transported from a source node to a destination node via an intermediate node. The intermediate node may be configured to process a plurality of CFM messages, such as Reflected Frame Messages (RFMs) or Send Frame Messages (SFMs). In one Forward Path Test (FPT) scheme, the source node may be a FPT originator, which may send a plurality of frames to the intermediate node. The intermediate node may receive and forward the frames to the destination node. The intermediate node may be a Reflection Responder (RR) that receives and encapsulates the frames into a plurality of RFMs, which may be forwarded to a target node. The target node may be a RFM receiver, which may receive and decapsulate the RFMs to obtain the original frame's content. Alternatively, in a Return Path Test (RPT) scheme, the source node may be a SFM originator that encapsulates a plurality of frames into a plurality of SFMs and send the SFMs to the intermediate node. The intermediate node may be a Decapsulator Responder (DR), which may receive and decapsulate the SFMs to obtain the original frames' content. The intermediate node may then forward the decapsulated frames to the destination node, which may be a RPT receiver. When the size of an RFM to be sent by a RR exceeds the maximum size allowed for a single RFM or when the size of an SFM to be sent by an SFM originator exceeds the maximum size allowed for a single SFM, the frame may be partitioned and encapsulated into at least a first CFM message and a second CFM message, each of which has a size less than or equal to the maximum size allowed. The first CFM message and second CFM message may then be forwarded to the appropriate RFM Receiver or DR, where they may be decapsulated to obtain the original frames' content. Additionally, a plurality of frames may be combined and encapsulated at the RR or SFM Originator and forwarded to the RFM Receiver or DR for decapsulation to restore the content of frames prior to encapsulation.

Figure 1:
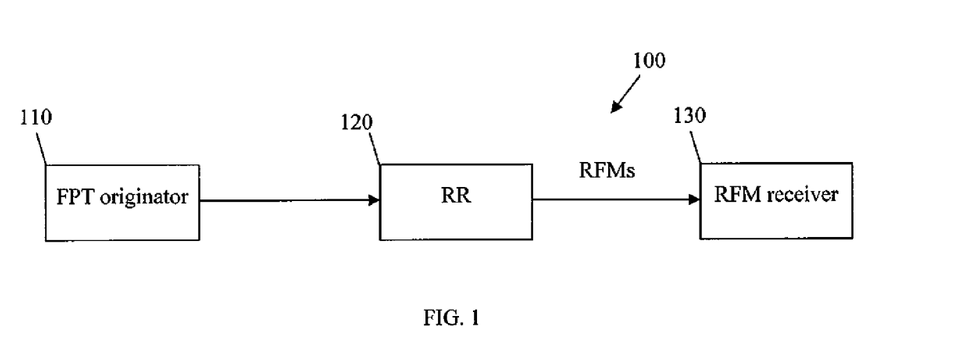
FIG. 1 is a schematic diagram of an embodiment of a DDCFM system.

FIG. 1 illustrates an embodiment of a DDCFM system 100, which may be used to diagnose DDFs, for instance in a bridged LAN. The DDCFM system 100 may use a FPT to detect the DDFs and may comprise a FPT originator 110, a RR 120, and a RFM receiver 130. The FPT originator 110, the RR 120, and the RFM receiver 130 may be any devices that transport frames through the DDCFM system 100. For example, the FPT originator 110, the RR 120, and the RFM receiver 130 may comprise a plurality of ingress ports for receiving frames from other nodes, logic circuitry to determine which nodes to send the frames to, and a plurality of egress ports for transmitting frames to the other nodes. The FPT originator 110, the RR 120, and the RFM receiver 130 may be bridges and may make the determinations needed to transport the frames through the network at Open System Interconnection (OSI) layer two.

In an embodiment, the FPT originator 110, the RR 120, and the RFM receiver 130 may comprise bridges and may be located in a network, such as an Ethernet based network, which may include a VLAN. Additionally, the FPT originator 110 may be configured to generate a plurality of data frames. The data frames may be associated with a service instance, a destination address, a VLAN, etc. The RR 120 may be configured to establish communications with the FPT originator 110 and the RFM receiver 130 in addition to another destination node in the network (not shown), which may be configured substantially similar to the FPT originator 110. For instance, the RR 120 may establish a bridged VLAN between the FPT originator 110 and the other destination node in the network and may forward a plurality of data frames from the FPT originator 110 to that destination node. Additionally, the RR 120 may establish communications with the RFM receiver 130 and may be configured to encapsulate the data frames generated by the FPT originator 110. The data frames may be encapsulated into a plurality of CFM messages, such as RFMs, for instance by adding RFM headers to the frames. The RR 120 may then forward the RFMs to the RFM receiver 130. The RFM receiver 130 may be configured to receive and process the RFMs to detect any DDFs that may be present. For example, the RFM receiver 130 may compare the received RFMs with the originally generated frames to detect any faults or errors.

Figure 2:
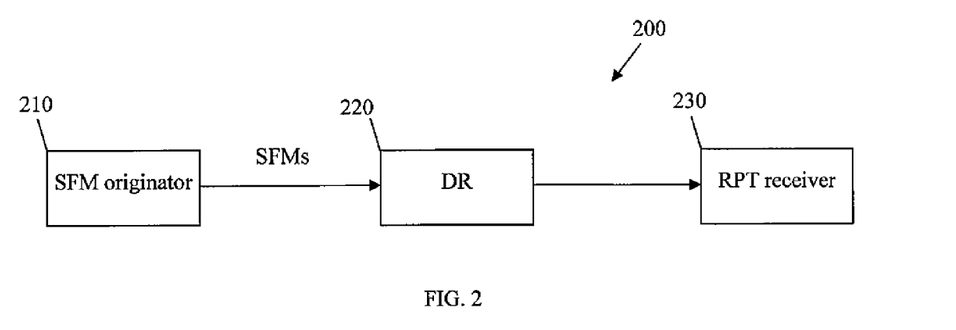
FIG. 2 is a schematic diagram of another embodiment of a DDCFM system.

FIG. 2 illustrates an embodiment of another DDCFM system 200, which may be used to diagnose DDFs. Specifically, the DDCFM system 200 may use a RPT to detect the DDFs and may comprise a SFM originator 210, a DR 220, and a RPT receiver 230. The SFM originator 210, the DR 220, and the RPT receiver 230 may be any devices that transport frames through the DDCFM system 200 in a network, such as a VLAN. The SFM originator 210, the DR 220, and the RPT receiver 230 may comprise a plurality of ingress ports for receiving frames from other nodes, logic circuitry to determine which nodes to send the frames to, and a plurality of egress ports for transmitting frames to the other nodes. The SFM originator 210, the DR 220, and the RPT receiver 230 may be bridges.

In an embodiment, the SFM originator 210 may be configured to generate CFM messages, such as SFMs. The SFMs may comprise data frames, which may be associated with a service instance, a VLAN, etc., and may be used for DDCFM. Additionally, the SFMs may comprise a destination address associated with the RPT receiver 230. The DR 220 may be configured to establish communications with the SFM originator 210 and the RPT receiver 230. The DR 220 may be configured to decapsulate the SFMs received from the SFM originator 210, for instance by removing the SFM headers, and forward the resulting decapsulated frames to the RPT receiver 230 based on the destination address. Additionally, the DR 220 may replace the source address or Media Access Control (MAC) address corresponding to the SFM originator 210 with the MAC address of the DR 220. Hence, the RPT receiver 230 may receive the frames and process the received frames to detect any DDFs that may be present.

Figure 3:
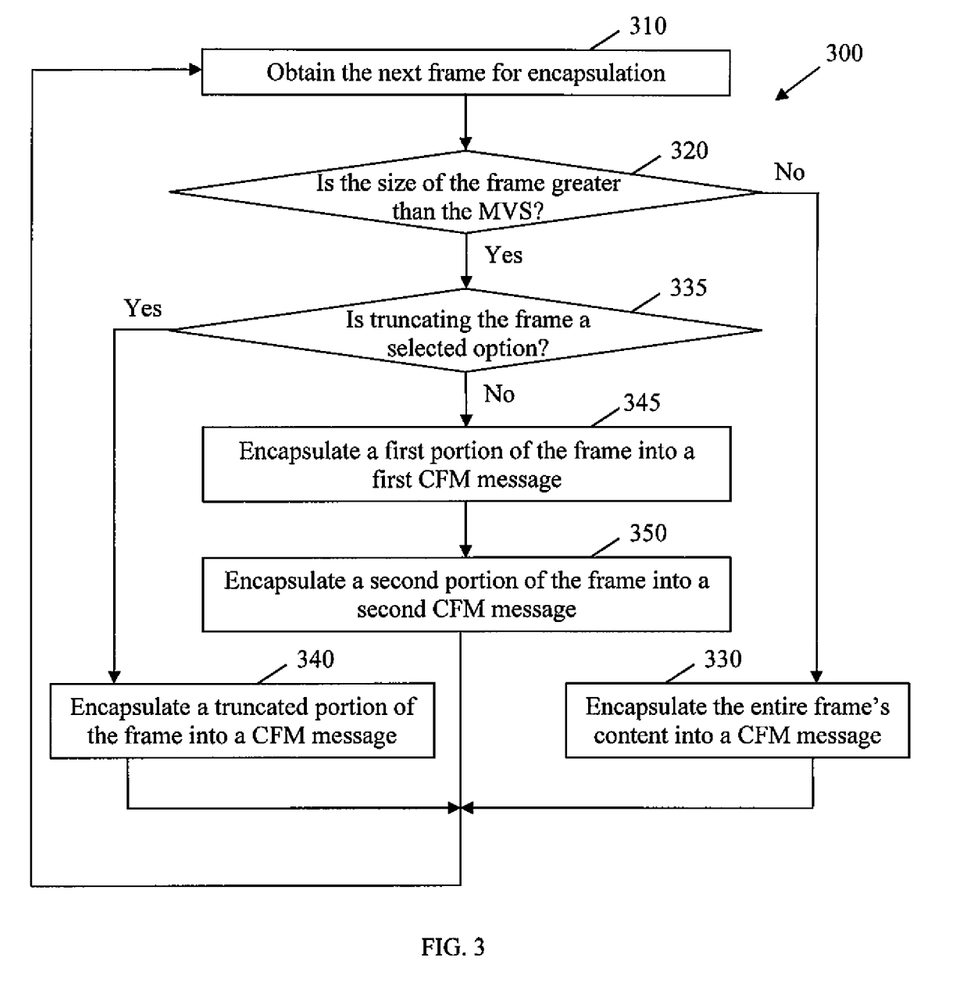
FIG. 3 is a flowchart of an embodiment of a CFM message encapsulation method.

FIG. 3 illustrates one embodiment of a CFM message encapsulation method 300, which may be used to encapsulate data frames into CFM messages. For instance, the CFM message encapsulation method 300 may be used by the RR 120 to encapsulate the frames into RFMs or by the SFM originator 210 to encapsulate the frames into SFMs. The frames may have any size, which may or may not exceed a maximum value size (MVS) of a value field in the CFM message's type length value (TLV), and may be encapsulated without truncating or deleting a portion of the frames' content. In an embodiment, the CFM message encapsulation method 300 may be used to encapsulate MAC Protocol Data Units (MPDUs), which may have a size greater than the MVS.

At block 310, the CFM message encapsulation method 300 may obtain the next frame for encapsulation, for instance from a queue or buffer. At block 320, the CFM message encapsulation method 300 may determine whether the size of the frame is greater than the MVS, which may be equal to about 1,500 bytes. If the size of the frame is smaller than or equal to the MVS, the CFM message encapsulation method 300 may proceed to block 330. Otherwise, the CFM message encapsulation method 300 may proceed to block 335.

At block 330, the CFM message encapsulation method 300 may encapsulate the frame's content into a CFM message. In an embodiment, the CFM message encapsulation method 300 may set the value of a type field in the CFM message's TLV equal to, for example three to indicate that the frame is entirely encapsulated in the CFM message without truncation or partitioning into additional CFM messages. The CFM message may then be sent to its destination, for instance using a CFM message frame, as described in more detail below, and the CFM message encapsulation method 300 may return to block 310. Alternatively, at block 335, the CFM message encapsulation method 300 may determine whether truncating the frame is a selected option. The frame may be truncated to reduce its size to less than or equal to the MVS by deleting or removing some of the frame's content. If truncating the frame is a selected option, for instance as decided by the administrator or service provider, the CFM message encapsulation method 300 may proceed to block 340. Otherwise, the CFM message encapsulation method 300 may proceed to block 345.

At block 340, the CFM message encapsulation method 300 may encapsulate a truncated portion of the frame into a CFM message. The truncated portion may have a size less than or equal to the MVS. In an embodiment, the CFM message encapsulation method 300 may set the value of the type field in the CFM message's TLV equal to, for example, nine to indicate that a truncated portion of the frame is encapsulated in the CFM message. The CFM message may then be sent to its destination, for instance using a CFM message frame, and the CFM message encapsulation method 300 may return to block 310. Alternatively, at block 345, the CFM message encapsulation method 300 may encapsulate a first portion of the frame into a first CFM message, which may have a size less than or equal to the MVS. At block 350, the CFM message encapsulation method 300 may encapsulate a second portion of the frame into a second CFM message, which may also have a size less than or equal to the MVS. In an embodiment, the combined first CFM message and the second CFM message may comprise the entire content of the frame without truncation or missing portions.

Further, the value of the type field may be set equal to, for example, ten in the first CFM message to indicate that the first CFM message comprises the first portion of the frame, and equal to, for example, eleven in the second CFM message to indicate that the second CFM message comprises the second portion of the frame. Additionally, a transaction identifier (TID) field may be set in the first CFM message to indicate that the message is the first CFM message in a sequence of two or more CFM messages, and in the second CFM message to indicate that the message is the second CFM message in the sequence of messages. For example, the values of the TID fields in the first CFM message and the second CFM message may be equal (e.g. both set to N, where N is an integer), or the value of the TID field in the second CFM message may be greater by one (e.g., N+1) than the value of the TID field in the first CFM message (e.g., N). The first CFM message and the second CFM message may be sent to their destination, for instance using CFM message frames, and the CFM message encapsulation method 300 may return to block 310.

Figure 4:
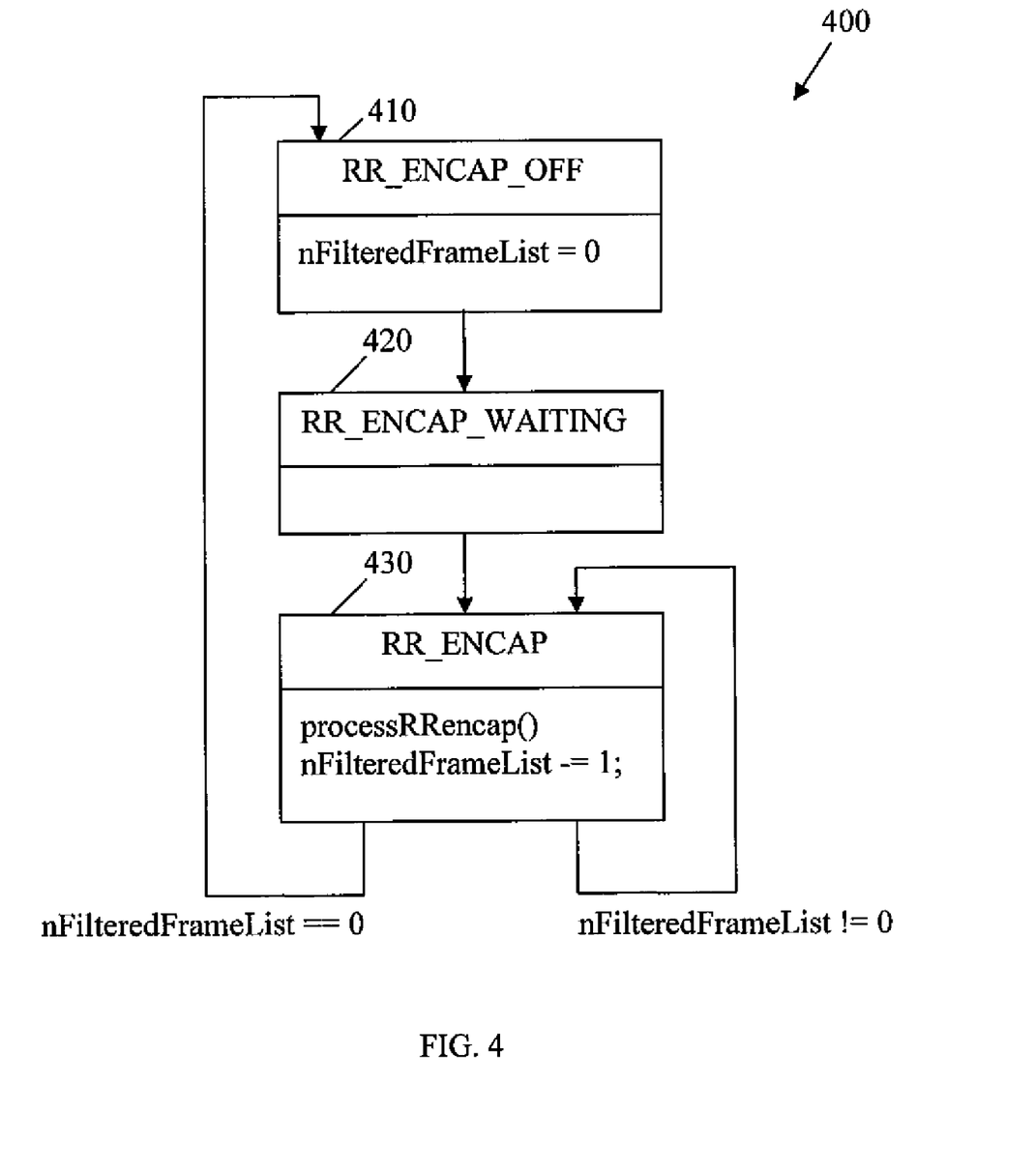
FIG. 4 is an illustration of an embodiment of a CFM message encapsulation state machine.

FIG. 4 illustrates an embodiment of a CFM message encapsulation state machine 400, which may be may be used by the RR 120 or the SFM originator 210 to encapsulate the frames into RFMs. The CFM message encapsulation state machine 400 may comprise a plurality of states similar to the states described in the IEEE 802.1Qaw standard. Specifically, if the received data frame causes the RFM encapsulated frame to exceed the Maximum Service Data Unit Size, either the data frame is truncated or the data frame is split into two smaller frames and those two smaller frames are encapsulated by two separate RFM frames. The CFM message encapsulation state machine 400 may also detect a Truncation flag. If the Truncation flag is set to be true, the data frame shall be truncated and encapsulated in one RFM frame.

The CFM message encapsulation state machine 400 may be initiated at a RR encapsulation deactivated (RR_ENCAP_OFF) state 410. During the RR_ENCAP_OFF state 410, an nFilteredFrameList parameter may be initialized, e.g. set equal to about zero. The nFilteredFrameList parameter may be a variable that keeps track of the number of filtered data frames to be encapsulated or reflected by the RR. This variable is incremented by a RR Filter and decremented by the CFM message encapsulation state machine 400. When the nFilteredFrameList variable is nonzero, the CFM message encapsulation state machine 400 may proceed to a RR encapsulation pending (RR_ENCAP_WAITING) state 420, for instance using an unconditional transfer (UCT) procedure. During the RR_ENCAP_WAITING state 420, the next data frame may be obtained, and the CFM message encapsulation state machine 400 may then proceed to a RR encapsulation (RR_ENCAP) state 430.

During the RR_ENCAP state 430, a processRRencap( ) procedure may be implemented. Specifically, the processRRencap( ) may be called when RR is activated and filteredFrameList is not empty. There may be two local variables in this procedure: DataFrame_1 and DataFrame_2, which may be used when the filtered frame has to be truncated or split into two frames to be reflected. In an embodiment, processRRencap( ) processes the incoming data frame from the RR Filter as follows:
  a) Set the reflectedDataLength to the length of the nextFilteredFrame;
  b) If the value of reflectedDataLength is larger than the bridge's maxDataTLVvalueSize, described in more detail below, then call splitFilteredFrame (nextFilteredFrame, DataFrame_1, DataFrame_2) and then perform the following two steps:
    1) If Truncation flag is set, call constructRFM(TruncatedDataTLVtype, maxDataTLVvalueSize, DataFrame_1), where the TruncatedDataTLVtype is set to the "Truncated Data TLV" type value defined by Table 1;
    2) If the Truncation flag is not set, perform the following two steps:
      constructRFM(DataPart1TLVtype, maxDataTLVvalueSize, DataFrame_1), where the DataPart1TLVtype is set to the "Data Part 1 TLV" type value defined by Table 1;
      constructRFM(DataPart2TLVtype, reflectedDataLength-axDataTLVvalueSize, DataFrame_2), where the DataPart2TLVtype is set to the "Data Part 2 TLV" type value defined by Table 1;
  c) Otherwise call constructRFM(DataTLVtype, reflectedDataLength, nextFilteredFrame), where DataTLVtype is set to the "Data TLV" type value defined by Table 1.

The splitFilteredFrame procedure is called when the nextFilteredFrame causes the length of RFM's service data unit size to be larger than the Maximum Service Data Unit Size. There are three parameters for this procedure:
  a) nextFilteredFrame, which is an input to the procedure;
  b) DataFrame_1, which contains the first maxDataTLVvalueSize number of bytes from the nextFilteredFrame; and
  c) DataFrame_2, which contains the remaining bytes from the nextFilteredFrame;

The splitFilteredFrame( ) procedure performs the following steps:
  a) Copy the maxDataTLVvalueSize number of bytes from the nextFilteredFrame to DataFrame_1; and
  b) Copy the remaining bytes from the nextFilteredFrame to DataFrame_2.

After implementing the processRRencap( ) procedure, the nFilteredFrameList may be decremented by about one.

The CFM message encapsulation state machine 400 may restart the RR_ENCAP state 430 if the nFilteredFrameList is not equal to about zero. Otherwise, the CFM message encapsulation state machine 400 may return to the RR_ENCAP_OFF state 410.

Figure 5:
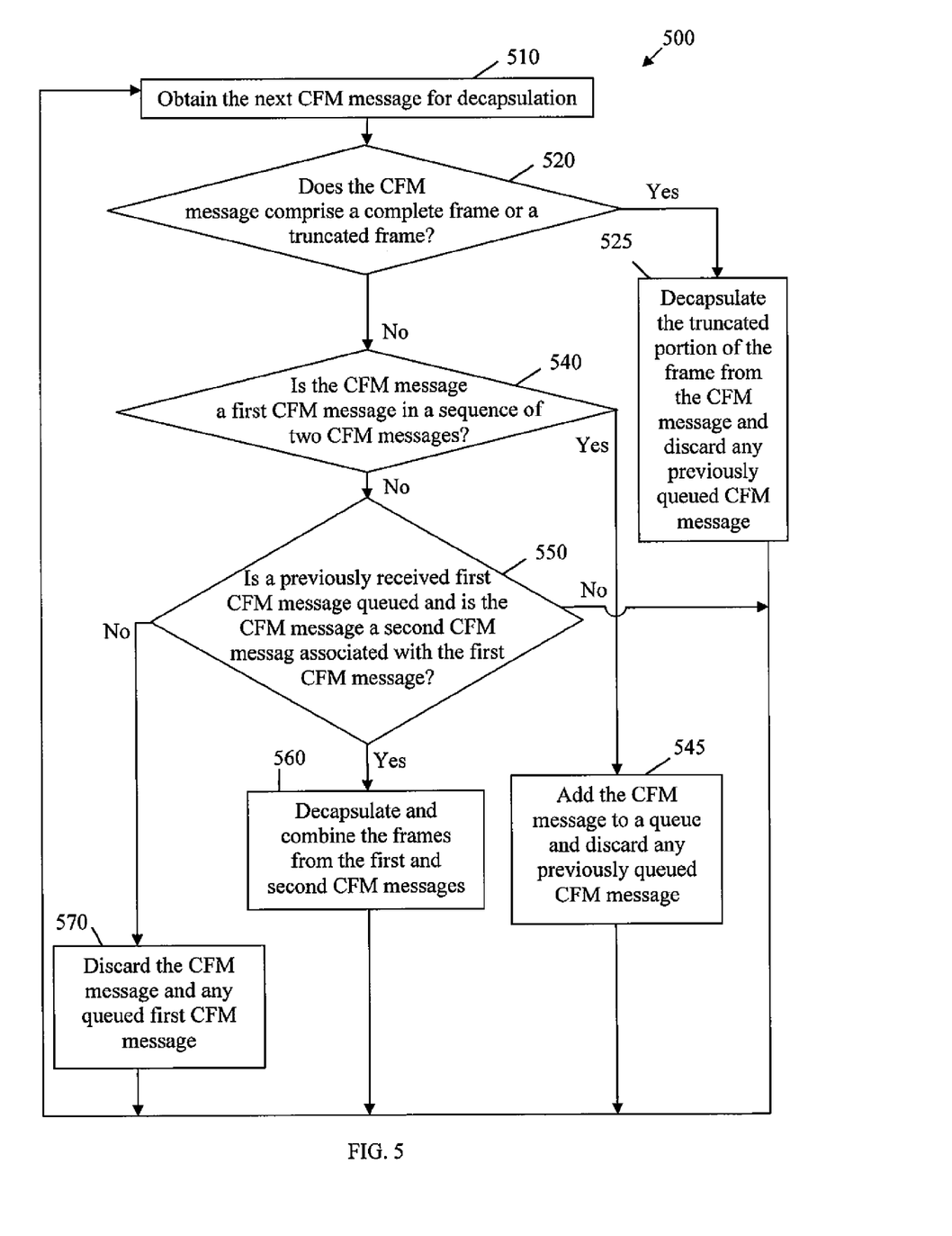
FIG. 5 is a flowchart of an embodiment of a CFM message decapsulation method.

FIG. 5 illustrates one embodiment of a CFM message decapsulation method 500, which may be used to decapsulate the originally encapsulated data frames' content from the received CFM messages. For instance, the CFM message decapsulation method 500 may be used by the RPM receiver 130 to decapsulate the RFMs, or by the DR 220 to decapsulate the SFMs. In an embodiment, the decapsulated data may correspond to MAC Protocol Data Units (MPDUs) content encapsulated in the CFM messages. In another embodiment of a FPT scheme, the Reflected Data TLV in RFM is a Data TLV to contain the reflected data frame. As such, the Length field is the total octets of the reflected data frame. The Type field of the Reflected Data TLV could be one of the four values from Table 1:

TABLE 1

| Type | Value |
|---|---|
| Data TLV | 3 |
| Truncated Data TLV | 9 |
| Data-Part-1 TLV Type | 10 |
| Data-Part-2 TLV Type | 11 |

At block 510, the CFM message decapsulation method 500 may obtain the next CFM message for decapsulation, for instance from a queue or buffer. At block 520, the CFM message decapsulation method 500 may determine whether the CFM message comprises a complete frame or a truncated frame, For instance, the CFM message decapsulation method 500 may determine whether the value of the type field in the CFM message's TLV is equal to three or nine. If the CFM message is found to comprise a complete frame or a truncated frame, the CFM message decapsulation method 500 may proceed to block 525; otherwise, the CFM message decapsulation method 500 may proceed to block 540. At block 525, the CFM message decapsulation method 500 may decapsulate the truncated portion of the frame from the CFM message. Additionally, the CFM message decapsulation method 500 may discard any previously queued CFM message, such as a first part of two associated CFM messages, which may be previously received. For instance, the truncated frame content may be obtained from the value field in the CFM messages' TLV. The CFM message decapsulation method 500 may then return to block 510.

At block 540, the CFM message encapsulation method 500 may determine whether the CFM message is a first CFM message in a sequence of two CFM messages; a first CFM message and a second CFM message, each containing a portion of the content of the original frame. The first CFM message and the second CFM message may comprise the entire content of an original frame, which may have a size greater than the MVS. For instance, the CFM message decapsulation method 500 may determine whether the value of the type field in the CFM message is equal to, for example, ten, which may indicate a PART 1 type message. If the CFM message is found to comprise the first portion of the frame, e.g., if the CFM message is a first CFM message, the CFM message decapsulation method 500 may proceed to block 545; otherwise, the CFM message decapsulation method 500 may proceed to block 550.

At block 545, the CFM message decapsulation method 500 may add the first CFM message to a queue. Additionally, the CFM message decapsulation method 500 may discard any previously queued first CFM message, which may be previously received. The CFM message decapsulation method 500 may then return to block 510. Alternatively, at block 550, the CFM message decapsulation method 500 may determine whether a previously received first CFM message is queued and whether the CFM message is a second CFM message associated with the first CFM message. For instance, the CFM message may be a second CFM message if the type field of the CFM message is equal to, for example, eleven, which may indicate a PART 2 type message. Further, the second CFM message may be associated with a queued first CFM message if the TID field of the second CFM message is greater than the TID field of the first CFM message by about one. If the second CFM message is associated with a queued first CFM message, the CFM message decapsulation method 500 may proceed to block 560; otherwise, the CFM message decapsulation method 500 may proceed to block 570.

At block 560 the CFM message decapsulation method 500 may decapsulate and combine the frames from the queued first CFM message and the second CFM message, which may comprise different portions of the same original frame. Hence, the entire content or at least some of the content of the original frame may be obtained. The CFM message decapsulation method 500 may then return to block 510. Alternatively, at block 570, the CFM message decapsulation method 500 may discard the CFM message and any queued first CFM message, and may then return to block 510

In some embodiments, the original frame content may have a size greater than the MVS and may not fit entirely in two CFM messages that have a size less than or equal to about the MVS. Accordingly, the frame may be partitioned using more than two CFM messages. For instance, instead of only a first message, e.g. a PART 1 type message, and a second CFM message, e.g., a PART 2 type message, the frame may be encapsulated using a plurality of FIRST_OR_MIDDLE type messages and a LAST type message. Specifically, the CFM message's type field may be used to indicate the message type. Further, the CFM messages may be associated with each other, for instance using a sequence of consecutive TID values, such as a consecutive sequence of integers that specify the order of the CFM messages. Alternatively, the CFM messages may be associated with one another using the same TID value and a plurality of type values that specify the order of the CFM messages. Further, in some cases the quantity of CFM messages that may be used to partition a single frame may be limited. As such, at least some portion of the frame may be partitioned and the remaining portion may be truncated. In some embodiments, a plurality of frames or frame portions, which may have a combined size less than the MVS, may be combined and encapsulated using a single CFM message to improve bandwidth utilization in DDCFM schemes. The CFM message may then be decapsulated at the receiver side to obtain the individual frames' content.

Figure 6:
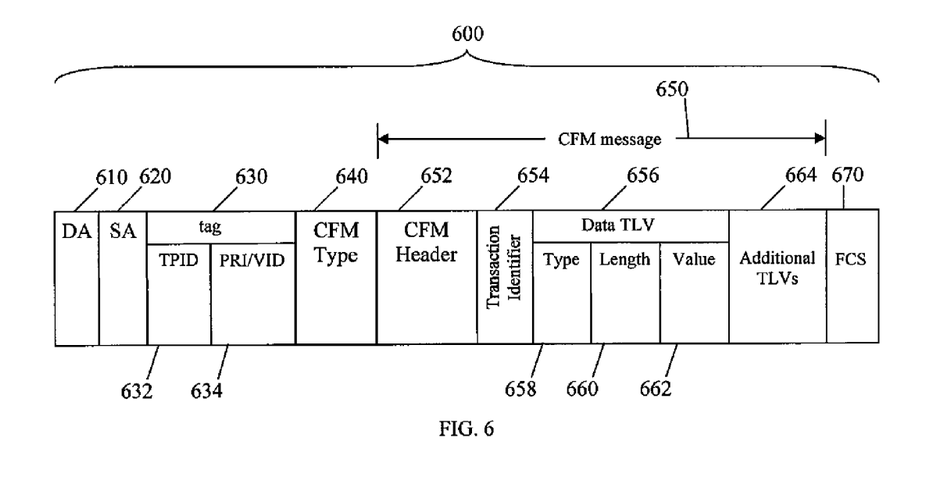
FIG. 6 is an illustration of an embodiment of a CFM message frame.

FIG. 6 illustrates an embodiment of a CFM message frame 600, which may be used to forward a CFM message, such as a RFM or a SFM, for instance in the DDCFM system 100 or the DDCFM system 200. For example, the CFM message frame 600 may comprise a RFM, which may be encapsulated by the RR at the intermediate node 120, or a SFM, which may be encapsulated by the SFM originator at the source node 210. Specifically, the CFM message frame 600 may comprise a destination address (DA) 610, a source address (SA) 620, a tag field 630, a CFM type field 640, a CFM message 650, and a frame check sum (FCS) field 670.

The DA 610 may comprise the network address or MAC address of the destination node, e.g. the target node 130 or the destination node 230. The SA 620 may comprise the network address or MAC address of the node that generates the original frame, e.g., the source node 110 or the source node 210. In some embodiments, the source nodes' address may be replaced by the encapsulating node's address, e.g., the intermediate node 120 or the intermediate node 220. The tag field 630 may comprise a tag protocol identifier (TPID) 632, which may be used to identify the protocol type used to transport the CFM message frame 600, and a priority (PRI)/VLAN ID (VID) 634, which may be used to indicate the priority level and/or the VLAN associated with the CFM message frame 600. The CFM type field 640 may indicate the presence of a CFM message in the CFM message frame 600. For instance, the CFM type field 640 may be equal to about 8102 in accordance with the IEEE 802.1Qaw standard, which is incorporated herein by reference as if reproduced in its entirety. The FCS field 670 may be used to detect bit errors in the CFM message frame 600. In an embodiment, each of the DA 610 and SA 620 may have a size equal to about six bytes, each of the TPID 632, PRI/VID 634, and CFM type field 640 may have a size equal to about two bytes, and the FCS field 670 may have a size equal to about four bytes.

The CFM message 650 may comprise a CFM header 652, a TID 654, a data TLV 656, and optionally at least one additional TLV 664. The CFM header 652 may indicate whether the CFM message is a RFM or a SFM. For instance, the CFM header 652 may comprise an operation code (opcode) equal to, for example, 6 to indicate a RFM or to, for example, seven to indicate a SFM. The TID 654 may indicate the sequence of the CFM message in a plurality of transmitted CFM messages. The data TLV 656 may comprise a type field 658, which may indicate if the CFM data content is entirely included, truncated, or partitioned, a length field 660, which may indicate the length of the data TLV 656 or the CFM message 650, and a value field 662, which may comprise the CFM data content. In an embodiment, the CFM header 652 may have a size equal to about five bytes, the TID 654 may have a size equal to about four bytes, the type field 658 may have a size equal to about one byte, and the length field 660 may have a size equal to about two bytes.

In an embodiment, the CFM message may be an Ethernet frame, which may be generated at the MAC layer, for example at the intermediate node 120 or the source node 210 such as a MAC Service Data Unit (MSDU). As such, the maximum size of the CFM message may be limited by a Maximum Transmission Unit (MTU) size of the MSDU. For example, the MTU size may be equal to about 1,500 bytes based on the IEEE 802.3 standard. In other embodiments, some nodes, such as bridges or switches, may support frame sizes that may be larger than about 1,500 bytes, e.g., Jumbo frames may be up to 9,000 bytes. Further, the size of the CFM message may be equal to the total size of its fields, e.g., the CFM header 652, the TID 654, the data TLV 656, and any additional TLVs 664. As such, the size of the CFM message may be equal to about 12 bytes in addition to the size of the value field 662 and the size of the additional TLVs 664. Since, the size of the CFM message may be limited by the MTU, the size of the value field 662 may also be limited by a MVS. As such, the MVS may be equal to the MTU size minus about 12 bytes and the size of the additional TLVs 664, which is referred to herein as A, where A is an integer For example, in the case where the MTU size is equal to about 1,500 bytes, the MVS for data TLV may be equal to about 1,500−(12+A) bytes or about 1,488−A bytes for normal Ethernet frames and about 8,988−A bytes for Jumbo Ethernet frames.

In an embodiment, the MVS may be a maxDataTLVvalueSize, as described in IEEE 802.1Qaw. The maxDataTLVvalueSize is the maximum number of bytes allowed to be copied into the reflected data TLV's value field in order to keep the RFM's service data unit size from exceeding its MSDU size (MSDUS). Accordingly, the RFM Protocol Data Unit (PDU) consists of common five bytes CFM header (4 bytes for CFM header+1 byte for End TLV(0)), 4 bytes Transaction Identifier, 3 bytes Reflected Data TLV Type/Length field, and actual number of bytes of the reflected data frame. If there is no other optional TLV for the RFM data frame, then the maxDataTLVvalueSize=MSDUS−(5(CFM common header length)+4 (Transaction Identifier)+3 (Reflected Data Frame TLV Type/Length field)) bytes.

In an embodiment, the CFM message frame 600 may be used to encapsulate a frame, such as a MPDU, which may have a size greater than or equal to about 64 bytes. The size of the MPDU may vary, for instance due to the presence or absence of tag fields, which may be know to the MAC transport layer. Further, if the data portion of the MPDU is fully occupied, the MPDU size may be greater than or equal to about 1,518 bytes. As such, the size of the MPDU may exceed the MVS (e.g., about 1,488−A bytes) of the value field 662. Accordingly, the data potion of the MPDU may be truncated to encapsulate the remaining portions into the CFM message frame 600, for instance as described in the IEEE 802.Qaw standard. However, using the truncated frames for DDCFM may be difficult or may not be suitable.

Figure 7:
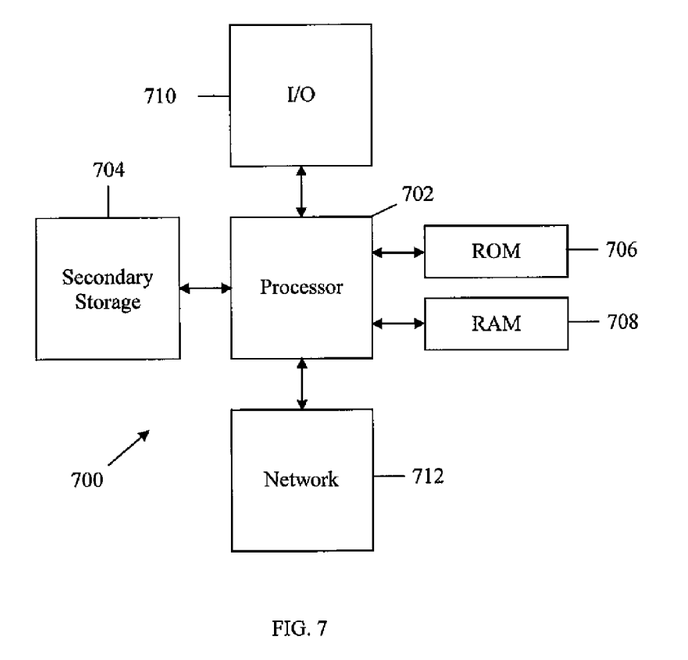
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising: receiving a data frame; encapsulating the received data frame into a reflected frame message (RFM) encapsulated frame; and if the received data frame causes the RFM encapsulated frame to exceed a maximum service data unit size, either the data frame is truncated or the data frame is split into two smaller frames and those two smaller frames are encapsulated by two separate RFM frames, wherein if a truncation flag is set to be true, the data frame is truncated to be encapsulated in one RFM encapsulated frame, wherein the RFM encapsulated frame is an Ethernet frame, wherein the RFM encapsulated frame comprises a Data TLV Type value, a Truncated Data TLV Type value, a Data-Part-1 TLV Type value, or a Data-Part-2 TLV Type value, and wherein the Data TLV Type value is 3, the Truncated Data TLV Type value is 9, the Data-Part-1 TLV Type value is 10, and the Data-Part-2 TLV Type value is 11.

2. The method of claim 1, wherein if a truncation flag is set to be false, the data frame is split into two smaller frames and those two smaller frames are encapsulated by two separate RFM frames.

3. The method of claim 1, wherein the received data frame is an Ethernet frame comprising an Ethernet header and an Ethernet payload, and wherein the Ethernet header comprises the truncation flag.

4. The method of claim 1, wherein the data frame is truncated to be encapsulated in one RFM encapsulated frame such that some of the data in the data frame is not present in the RFM encapsulated frame.

5. The method of claim 1, wherein the data frame is encapsulated into two separate RFM frames such that substantially all of the data in the data frame is comprised by the combination of the two separate RFM frames.

6. The method of claim 1, wherein the maximum service data unit size is 1488 bytes, 1500 bytes, 8988 bytes, or 1900 bytes.

7. The method of claim 1, wherein the method is performed by a Data Driven Connectivity Fault Management (DDCFM) component.

8. The method of claim 7, wherein the DDCFM component comprises a reflection responder (RR).

9. The method of claim 8, wherein the RR is coupled to a forward path test (FPT) originator and an RFM receiver such that the RR is positioned between the FPT originator and the RFM receiver.

10. The method of claim 9, wherein the data frame is received from the FPT originator.

11. The method of claim 10 further comprising transmitting the RFM encapsulated frame or the two separate RFM frames to the RFM receiver after encapsulating the received data frame into the RFM encapsulated frame or the two separate RFM frames.

12. The method of claim 10, wherein the FPT, the RFM, and the RR are Ethernet bridges.

13. The method of claim 1, further comprising configuring a Reflected Data type length value (TLV) in the RFM encapsulated frame, wherein encapsulating the received data frame into the RFM encapsulated frame comprises storing all or some of the reflected data frame in a value field of the reflected Data TLV.

14. A network component comprising:
a processor configured to:
determine a maximum number of bytes allowed to be copied into a Reflected Data type length value (TLV)'s value field in order to keep a reflected frame message (RFM)'s service data unit size not exceeding its Maximum Service Data Unit Size (MSDUS),
wherein the length of a RFM protocol data unit (PDU) is 12 octets comprising 4 bytes for the connectivity fault management (CFM) header, 1 byte for an End TLV, a 4 byte Transaction Identifier, and a 3 byte Reflected Data TLV Type/Length field, plus an actual number of bytes of the reflected data frame, and
wherein if there is no other optional TLV for a RFM data frame, then a maximum data TLV value size (maxDataTLVvalueSize) equals MSDUS−(5(CFM common header length)+4(Transaction Identifier)+3(Reflected Data Frame TLV Type/Length field)) bytes.

15. A bridge comprising: a processor configured to configure a Reflected Data type length value (TLV) in a reflected frame message (RFM) to be a Data TLV that contains a reflected data frame, wherein a Length field is the total octets of the reflected data frame, wherein a Type field of the Reflected Data TLV is a Data TLV Type value, a Truncated Data TLV Type value, a Data-Part-1 TLV Type value, or a Data-Part-2 TLV Type value, and wherein the Data TLV Type value is 3, the Truncated Data TLV Type value is 9, the Data-Part-1 TLV Type value is 10, and the Data-Part-2 TLV Type value is 11.

16. The bridge of claim 15, wherein the Type field of the Reflected Data TLV is the Data TLV Type value.

17. The bridge of claim 15, wherein the Type field of the Reflected Data TLV is the Truncated Data TLV Type value.

18. The bridge of claim 15, wherein the Type field of the Reflected Data TLV is the Data-Part-1 TLV Type value.

19. The bridge of claim 15, wherein the Type field of the Reflected Data TLV is the Data-Part-2 TLV Type value.

* * * * *